US011307840B2

(12) United States Patent
Delgado Campos et al.

(10) Patent No.: US 11,307,840 B2
(45) Date of Patent: Apr. 19, 2022

(54) SOFTWARE VERSION DETERMINATIONS BASED ON RELEASE NOTES AND SUPPORT FILE

(71) Applicant: HEWLETT PACKARD ENTERPRISE DEVELOPMENT LP, Houston, TX (US)

(72) Inventors: Allan Delgado Campos, Heredia (CR); Leonel Salazar Valverde, Heredia (CR); Daniela Ramirez Chaves, Heredia (CR)

(73) Assignee: Hewlett Packard Enterprise Development LP, Houston, TX (US)

( * ) Notice: Subject to any disclaimer, the term of this patent is extended or adjusted under 35 U.S.C. 154(b) by 79 days.

(21) Appl. No.: 16/503,723

(22) Filed: Jul. 5, 2019

(65) Prior Publication Data

US 2021/0004219 A1 Jan. 7, 2021

(51) Int. Cl.
*G06F 8/65* (2018.01)
(52) U.S. Cl.
CPC ..................... *G06F 8/65* (2013.01)
(58) Field of Classification Search
USPC ....................................................... 717/169
See application file for complete search history.

(56) References Cited

U.S. PATENT DOCUMENTS

| 5,960,189 | A * | 9/1999 | Stupek, Jr. | G06F 8/658 717/169 |
| 7,386,845 | B1 * | 6/2008 | Fox | G06F 8/61 717/169 |
| 8,707,289 | B2 | 4/2014 | Firman et al. | |
| 9,383,993 | B2 | 7/2016 | Nigul | |
| 9,639,341 | B2 | 5/2017 | Freiter et al. | |
| 10,069,940 | B2 * | 9/2018 | Smith | H04L 67/42 |
| 2008/0301666 | A1 * | 12/2008 | Gordon | G06F 8/65 717/172 |
| 2017/0039372 | A1 * | 2/2017 | Koval | G01R 22/06 |

FOREIGN PATENT DOCUMENTS

WO WO-2017000743 A1 1/2017

OTHER PUBLICATIONS

"Machine Learning"; Wikipedia.org website; Jul. 4, 2019 (Year: 2019).*
Cisco, "Cisco Prime Infrastructure 3.4 User Guide," Feb. 18, 2019, pp. 1-25 (online), Retrieved from the Internet on Feb. 26, 2019 at URL: <cisco.com/c/en/us/td/docs/net_mgmt/prime/infrastructure/3-4/user/guide/bk_CiscoPrimeInfrastructure_3_4_0_UserGuide/bk_CiscoPrimeInfrastructure_3_4_0_UserGuide_chapter_0111.html>.
Juniper Networks, Inc., "Software Upgrade Recommendation and Review," Oct. 2010, pp. 1-5.

* cited by examiner

*Primary Examiner* — Qing Chen
*Assistant Examiner* — Clint Thatcher
(74) *Attorney, Agent, or Firm* — Hewlett Packard Enterprise Patent Department

(57) ABSTRACT

Example implementations relate to software versions for a software-upgradeable device, such as a networking device. In an example, a software version and release notes of the software version are registered into a knowledge base. A support file is received from the software-upgradable device. Based on the release notes and the support file, a determination is made as to whether the software version is beneficial to the software-upgradable device.

19 Claims, 5 Drawing Sheets

SOFTWARE VERSION DETERMINATIONS BASED ON RELEASE NOTES AND SUPPORT FILE

BACKGROUND

Electronic devices, including computing infrastructure components such as network switches and the like, may include a software component. A developer may release different versions of software. Newer versions of software may provide fixes, new features, or enhanced capabilities to an electronic device.

BRIEF DESCRIPTION OF THE DRAWINGS

Various examples will be described below with reference to the following figures.

DETAILED DESCRIPTION

Figure 1:
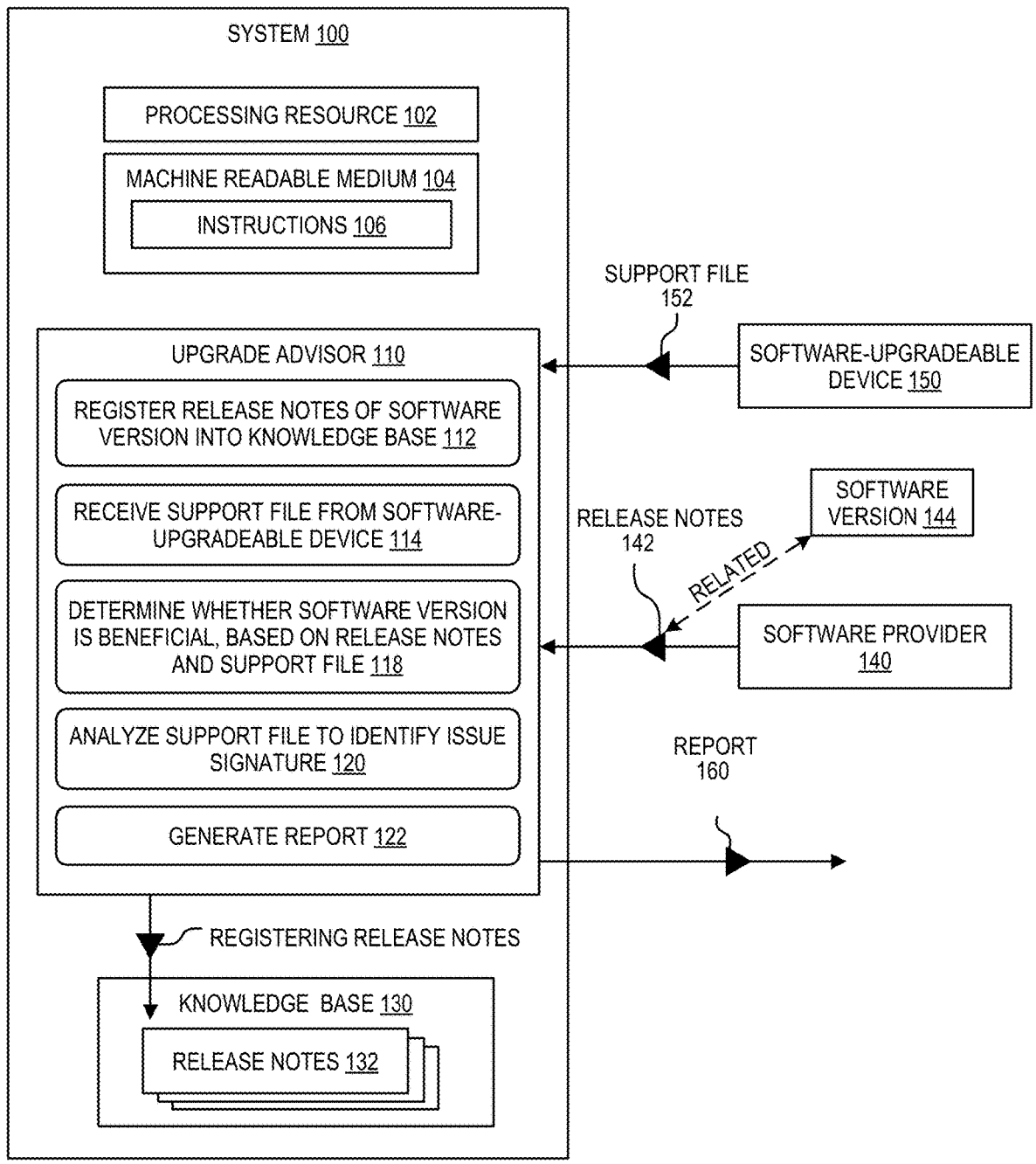
FIG. 1 depicts an example system that determines whether a software version is beneficial to a software-upgradeable device.

Software may play a role in the operation of one or more features of an electronic device. Examples of electronic devices with software may include computing systems (e.g., servers), storage arrays, networking devices (e.g., switches, routers, edge devices), internet-of-things devices (e.g., smart home, enterprise, or city devices), mobile devices, etc.

Developers of software may release different versions of software. For example, developers may release new versions of software over time that fix bugs or security holes in older versions, add new features, add enhancements to existing features, or improve performance over older versions. Software on some electronic devices may be replaced with a different version. In some cases, the electronic device may permit an older version to be installed (e.g., which may be referred to as rolling back the software) and/or permit a newer version to be installed. An electronic device that allows its software to be replaced may be referred to herein as a "software-upgradeable device". The software may be installed via a network, via a tangible installation medium (e.g., a compact disc, USB drive, etc.), or other means of electronic communication.

However, there may be costs associated with the installation of software on an electronic device. For example, software installation may impact service availability, particularly if the electronic device undergoes a reboot or other downtime. Thus, operators (e.g., administrators, users, etc.) of software-upgradeable devices, and of large deployments of networks or networked systems in particular, may spend time and money to plan maintenance windows and rollback strategies in case an upgrade is unsuccessful or results in unexpected or negative consequences. The administrative burden of planning and executing installations of a particular software version should be balanced against the benefit (or lack thereof) derived from that software version.

Accordingly, It may be useful to provide an operator of software-upgradeable device(s) with a recommendation of whether a particular software version (e.g., a new version) will beneficially improve the operation of the software-upgradeable device if that software version were installed. Examples described herein may relate to a processor-based system that automatically determines whether to recommend a particular software version based on the release notes for that software version and a support file received from the software-upgradeable device. By virtue of examples described herein, operators can improve planning of software updates to deployed devices and can avoid upgrading to versions of software that do not add value, thus reducing the number of upgrades performed. Moreover, examples described herein may generate a report that can assist operators to quickly assess the benefits of a recommended software upgrade. Advantageously, operators may thus spend less time manually analyzing newly available software versions to understand what fixes or functionalities are provided and whether installing a software version will benefit the deployed devices.

Referring now to the figures, FIG. 1 illustrates an example system 100 for making automatic recommendations about a software version 144 that can be installed on a software-upgradeable device 150 (which may also be referred to herein as device 150 for convenience). In some implementations, the system 100 may be a server, a computer appliance, a workstation, a desktop computer, a laptop, a mobile device, or any other type of computing system. The system 100 includes a processing resource 102 and a machine readable medium 104. The processing resource 102 may include a microcontroller, a microprocessor, central processing unit core(s), an application-specific integrated circuit (ASIC), a field programmable gate array (FPGA), or the like. The machine readable medium 104 may be non-transitory (i.e., does not encompass transitory propagating signals) and may include random access memory (RAM), read-only memory (ROM), electrically erasable programmable read-only memory (EEPROM), flash memory, a hard disk drive, solid state disk, or the like. The processing resource 102 may execute instructions 106 (i.e., programming or software code) stored on the machine readable medium 104. Additionally or alternatively, the processing resource 102 may include electronic circuitry for performing the instructions and functionality described herein. In particular, the processing resource 102 may execute instructions 106 (and/or utilize electronic circuitry) to implement an upgrade advisor 110 with the following functionality 112, 114, 118, 120, 122. Instructions 106 may include at least some of the instructions described below with reference to FIGS. 2 and 3.

The upgrade advisor 110 may include functionality 112 to register a software version 144 and release notes 142 of the software version 144 into a knowledge base 130. The release notes 142 may include one or more individual release notes, and an individual one of the release notes 142 may be referred to herein as a release note 142. In some implementations, a single software version 144 may be associated with one or more release notes 142.

The upgrade advisor 110 may receive release notes 142 for a software version 144 from software provider 140. The software provider 140 may be a developer of software for a software-upgradeable device 150. As described above, a software-upgradeable device 150 may be a computing system, a storage array, a networking device, an internet-ofthings device, a mobile devices, etc. In a particular example, the software-upgradeable device 150 may be a networking device, such as a switch, and the software that may be upgraded may be an operating system of the networking device.

The knowledge base 130 may be a data store on persistent storage (e.g., hard disk drive, solid state drive, etc.) and may be capable of storing a plurality of release notes 132 for one or more software versions (e.g., including different versions of the same software and/or different versions for different software) and maintaining a correspondence between the release notes 132 and the identity of the associated software version (e.g., software version name, number). Thus, when received release notes 142 are registered to the knowledge base 130 by the upgrade advisor 110 (i.e., functionality 112), release notes 142 may be stored among the plurality of release notes 132. In some implementations, the software version 144 may also be stored on the system 100 (not shown), although the software version 144 need not be stored on the system 100 and may be stored on another system which may participate in delivering the software version 144 to a software-upgradeable device.

In some implementations, the upgrade advisor 110 registers the software version 144 and associated release notes 142 by adding the software version identity to the knowledge base 130, transforming the release notes 142 into a format for subsequent analysis (e.g., analysis described in functionality 118 below), and adding the transformed release notes 142 to the knowledge base 130. Registering the release notes may include parsing the release notes into a format that can later be matched against data extracted from support files. For example, a release note may be summarized in a metadata tag.

Various non-limiting examples of release notes will now be described. A release note may describe an enhancement to the software-upgradeable device provided by the software version 144, such as a new feature, an enhancement to an existing feature, or the like. A release note may describe a fix, such a security fix or a bug fix. The fix may correct issues with previous software versions or with the software-upgradeable device (e.g., hardware or firmware issues). A release note may describe a performance improvement, a scalability improvement, or the like. For example, a scalability improvement release note may relate to scale numbers or like parameters implemented in the software version 144 that may improve the ability of a software-upgradeable device to scale, that is, to handle an increased workload.

The upgrade advisor 110 may include functionality 114 to receive a support file 152 from the software-upgradable device 150. The support file 152 may include diagnostic statistics and configuration information about the software-upgradable device 150. For example, in some implementations, diagnostic statistics may include any log that describes the activity of the software-upgradeable device 150, such as a debug log, an error log, an event log, or the like. In some implementation, diagnostic statistics may include resource usage statistics, such as statistics about CPU usage, RAM usage, storage usage, network usage and/or traffic, etc. Moreover, resource usage statistics may be reported on a per-process basis. Configuration information may describe, for example, a current version number of the software on the device 150, an indication of what features are enabled, how options are configured, or the like.

The support file 152 may be received by the upgrade advisor 110 from the software-upgradeable device 150 under a variety of conditions. For example, in some implementations, the device 150 may send a support file 152 as part of a call home routine. The device 150 may send the support file 152 on a periodic basis (e.g., daily, weekly, biweekly, monthly, etc.). The device 150 may send a support file 152 after a failure or crash of the device 150. The device 150 may send a support file 152 in response to a user command or in response to a request from the upgrade advisor 110.

The upgrade advisor 110 may include functionality 118 to automatically determine whether the software version 144 is beneficial to the software-upgradable device 150, based on the support file 152 and the release notes 142 associated with the software version 144 that are registered to the knowledge base 130. In other words, the upgrade advisor 110 determines whether the software version 144 would improve operation of the software-upgradeable device 150, if the software version 144 were applied (i.e., installed) to the device 150. A determination of whether the software version 144 is beneficial and improves the operation of the device 150 in effect determines whether the software version 144 is recommended to be installed to the device 150.

In particular, to make a determination of whether the software version 144 is beneficial, the upgrade advisor 110 may analyze the release notes 142 associated with the software version 144 to determine whether that release note does or does not apply (i.e., is relevant to) the device 150 as described by the support file 152. The upgrade advisor 110 may filter out (i.e., remove as irrelevant) each of the release notes 142 of the software version 144 that is not relevant to the software-upgradable device 150. In an implementation, if all release notes 142 for the software version 144 have been filtered out, then the upgrade advisor 110 may make a determination that the software version 144 is not beneficial to the device 150 and is not recommended to be installed to the device 150. In some implementations, the upgrade advisor 110 may determine a degree of recommendation or benefit to the device 150 that is a function of how many release notes 142 were not filtered out. In some implementations, the upgrade advisor 110 may determine that the software version 144 is or is not recommended based on a configurable threshold quantity (e.g., a percentage, such as 50%) of filtered release notes. Thus, in some examples, the balance between upgrade benefit and administrative burden can be adjusted. In some implementations, the term "not recommended" may mean that while the software version 144 is safe, the software version 144 does not sufficiently enhance the operation of the particular device 150, and that the software version 144 may be skipped by the device operator to avoid administrative burden (as opposed to meaning that the software version 144 is "not recommended" due to being harmful or detrimental to the operation of the device 150). Various examples of release note analysis will now be described.

In some implementations, an initial determination may include determining whether the software version 144 is compatible with the device 150. For example, a compatibility determination may include verifying that the model, version, etc. of the device 150 as indicated in the support file 152 meet compatibility requirements listed in the release notes 142.

If a release note 142 describes a fix (e.g., bug fix, security fix, performance fix, etc.), then the upgrade advisor 110 may determine whether that fix is relevant to the device 150 based on the support file 152. The determination may depend on whether an issue corrected by the fix is identified in the support file 152. If the support file 152 does not include the issue, then the release note 142 may be deemed not relevant to the device 150. As an illustration, a release note 142 may indicate that the software version 144 provides a high CPU usage fix for a particular process. If the upgrade advisor 150 determines from the support file 152 that the same particular process running on the device 150 had high CPU usage (e.g., relative to a predefined threshold, a historical trend, or other point of comparison), that release note 142 may be deemed relevant and would not be filtered out by the upgrade advisor 110. On the other hand, if the support file 152 did not indicate a CPU usage issue for that process, then the release note 142 may be filtered out by the upgrade advisor 110. A similar determination to the foregoing CPU usage fix may be made for release notes 142 relating to other performance improvements or optimizations.

In some implementations, a fix described in a release note 142 may be directed to a particular feature, and the determination of whether that fix is relevant to the device 150 may involve determining whether the particular feature is enabled. As an illustration, a software version 144 for network switches may include a fix for a BGP (Border Gateway Protocol) feature, and the upgrade advisor 110 may filter out the corresponding release note 142 for the BGP fix if the support file 152 indicates that BGP is not enabled at the device 150.

If a release note describes an enhancement (e.g., new feature, enhancement to existing feature, etc.), the upgrade advisor 110 may determine whether the enhancement is relevant to the software-upgradable device 150 based at least in part on how an operational state of the device 150 is described by the support file 152, including diagnostic statistics or configuration information therein. The operational state of the device 150 may include characteristics such as whether certain features or options are enabled, the type of activity handled by the device 150, or other information pertaining to the operation of the device 150.

Such a determination of enhancement relevance may essentially determine whether the device 150 can make use of the enhancement. As an illustration, a software version 144 for network switches may include an enhancement that applies to the handling of unknown IPv6 multicast traffic, and the upgrade advisor 110 may filter out the corresponding release note 142 for that enhancement if switch counter metrics in the support file 152 do not indicate unknown IPv6 multicast traffic having been handled by a switch-type device 150.

If a release note describes an improvement, such as a scalability or performance improvement, the upgrade advisor 110 may determine from the support file 152 whether the device 150 is operating or has operated in a manner that is limited in some way and could benefit from the improvement. For example, currently installed software on a network switch-type of device 150 may support up to a given maximum number of link aggregation groups. If a user unsuccessfully attempts to configure more than that maximum number, the support file 152 may include an error log entry indicating that attempt. If a release note 142 for a newer software version 144 indicates support for a higher maximum number of link aggregation groups (a scale number improvement), the upgrade advisor 110 may determine that that software version 144 is beneficial to the device 150 in view of the error log entry in the support file 152 and would not filter out the release note 142. In another example, the upgrade advisor 110 may determine that the release note 142 is relevant and is not to be filtered out if the support file 152 indicates that the device 150 is currently configured at or close to the maximum number (where "close to" may mean a predefined number under the maximum number).

In some implementations, release notes 142 may include signatures of issues fixed by the software version 144. A signature included in release notes 142 may be previously identified using analytical techniques such as statistical modeling, artificial intelligence, machine learning, or the like on training data associated with a known issue (e.g., an issue verified by expert analysis). The training data for the prior identification of a signature may include support files that are similar in some or many respects to the support file 152, and may include log files, diagnostic statistics, configuration information, crash backtraces, etc. A signature included in a release note may be represented by a metadata tag and/or accompanied by a human readable description.

The upgrade advisor 110 may evaluate a release note 142 that includes a signature by utilizing functionality 120 to analyze the support file 152 to identify signatures of issues, if any, and utilizing functionality 118 described above to compare any signatures identified from the support file 152 against the signature included in the release note 142. A match may indicate that the release note 142 is relevant to the device 150. On the other hand, no matches for the signature in the release note 142 may indicate that the release note 142 is not relevant and should be filtered out. In some implementations, to carry out functionality 120, the upgrade advisor 110 may process statistics, log data, a crash backtrace, etc. from the support file 152 received from the device 150 using any suitable analytical tools, such as the tool(s) used to identify signatures from training data. In some implementations, functionality 120 may output a metadata tag corresponding to an identified signature, and functionality 118 may compare the metadata tag from functionality 120 to signature metadata tag(s) in release notes 142.

The upgrade advisor 110 may include functionality 122 to generate a report 160. The report 160 may be received by an operator of the software-upgradeable device 150 (e.g., a user, an administrator, etc.) and may be used by the operator to decide whether to install the software version 144 on the device 150. The report 160 may indicate whether the software version 144 is beneficial to the device 150, would improve operation of the device 150, and/or is recommended as an upgrade. For example, the upgrade advisor 110 may indicate in the report 160 that the software version 144 is beneficial and recommended for installation based on whether release notes 142 were filtered out. The report 160 may also include an indication of what issue(s) may be corrected by the software version 144 (e.g., if a release note for a fix was determined to be relevant), an indication of an enhancement that the software version 144 may provide to the device 150 (e.g., if a new feature or enhancement to a feature was determined to be relevant), or any other benefits or improvements that may be conferred to the device based on the analysis of release notes 142 in view of the support file 152.

In some implementations, the upgrade advisor 110 may analyze multiple sets of release notes for different respective software packages to determine which, if any, of those software packages are beneficial to the software-upgradeable device 150, based on the support file 152 and those multiple sets of release notes. For example, the software version 144 may be among a plurality of available software packages having corresponding sets of release notes registered in the knowledge base 130 (e.g., release notes 132). The upgrade advisor 110 may perform a determination using at least functionality 118 on each of those sets of release notes for each corresponding software package.

Figure 2:
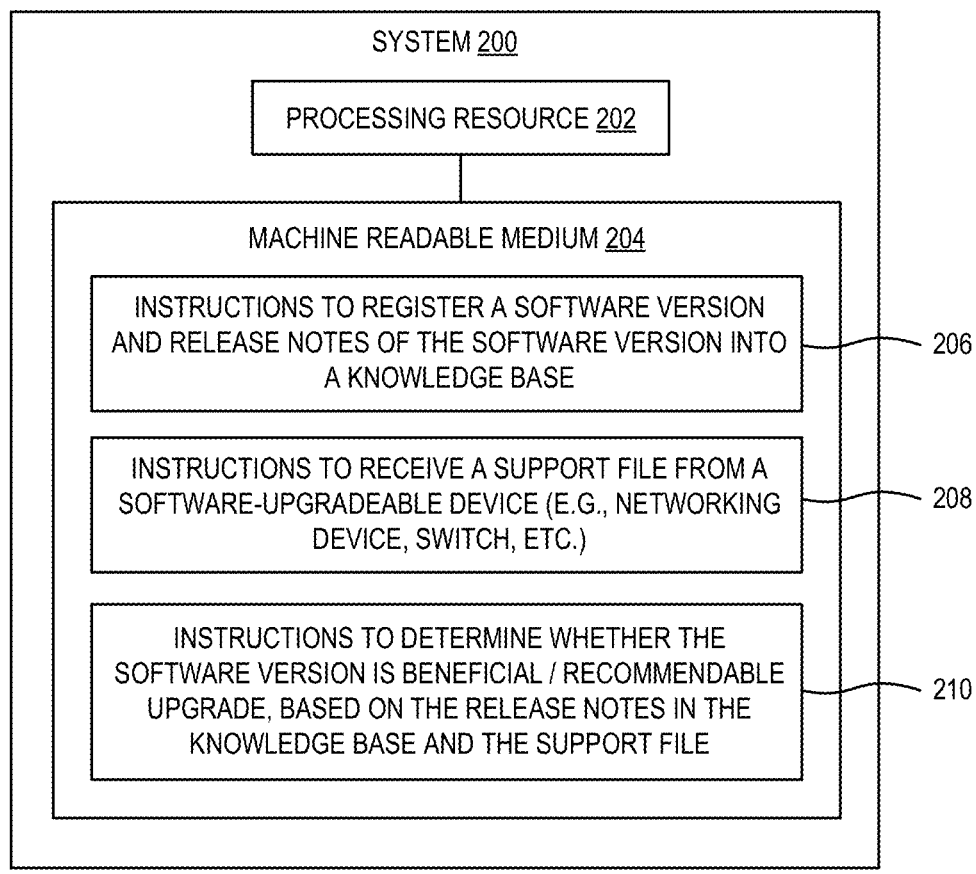
FIG. 2 depicts an example system with a machine readable medium that includes instructions to determine whether a software version is recommendable to a software-upgradeable device.

FIG. 2 depicts an example system 200 that includes a non-transitory, machine readable medium 204 encoded with example instructions 206, 208, 210 executable by a processing resource 202. In some implementations, the system 200 may serve as or form part of the system 100. The processing resource 202 may include a microcontroller, a microprocessor, central processing unit core(s), an ASIC, an FPGA, and/or other hardware device suitable for retrieval and/or execution of instructions from the machine readable medium 204 to perform functions related to various examples. Additionally or alternatively, the processing resource 202 may include or be coupled to electronic circuitry or dedicated logic for performing some or all of the functionality of the instructions described herein.

The machine readable medium 204 may be any medium suitable for storing executable instructions, such as RAM, ROM, EEPROM, flash memory, a hard disk drive, an optical disc, or the like. In some example implementations, the machine readable medium 204 may be a tangible, non-transitory medium. The machine readable medium 204 may be disposed within the system 200, in which case the executable instructions may be deemed installed or embedded on the system 200. Alternatively, the machine readable medium 204 may be a portable (e.g., external) storage medium, and may be part of an installation package. As described further herein below, the machine readable medium 204 may be encoded with a set of executable instructions 206, 208, 210. It should be understood that part or all of the executable instructions and/or electronic circuits included within one box may, in alternate implementations, be included in a different box shown in the figures or in a different box not shown. Some implementations of the system 200 may include more or fewer instructions than are shown in FIG. 2. In some implementations, one or more of the instructions 206, 208, 210 may be useful for implementing aspects of the upgrade advisor 110.

Instructions 206, when executed, cause the processing resource 202 to register a software version and release notes of the software version into a knowledge base. The release notes may include notes indicating that the software version includes a feature enhancement, a security fix, a bug fix, a scalability improvement, a performance improvement, or the like. Instructions 206 may be executed to implement functionality 112, for example.

Instructions 208, when executed, cause the processing resource 202 to receive a support file from a software-upgradeable device. The support file may include diagnostic statistics and configuration information about the software-upgradeable device. In some examples, the software-upgradeable device may be a networking device, such as a switch. Instructions 208 may be executed to implement functionality 114, for example.

Instructions 210, when executed, cause the processing resource 202 to determine, based on the release notes in the knowledge base and the support file, whether the software version is beneficial to the software-upgradeable device and thus recommended to be installed to the software-upgradeable device. Instructions 210 may be executed to implement functionality 118, for example.

Figure 3:
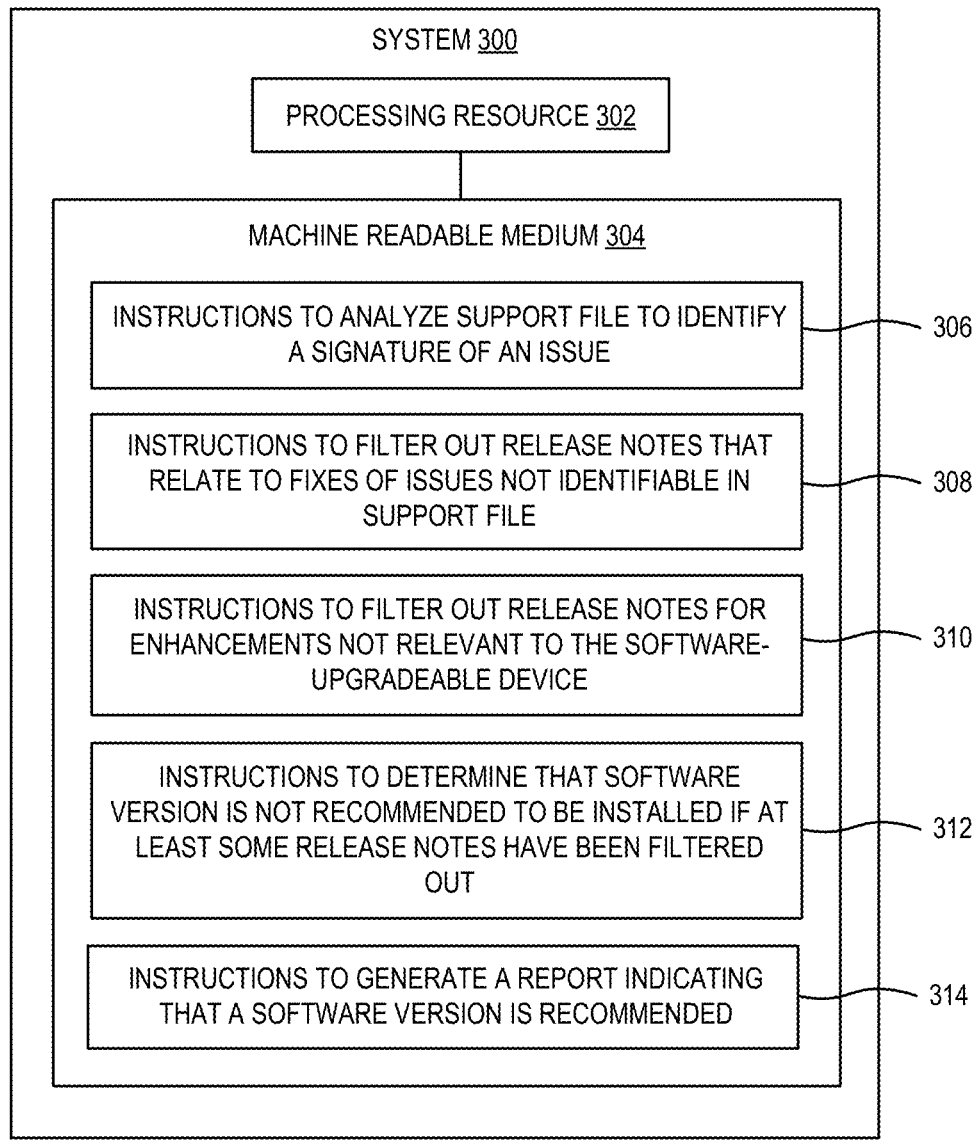
FIG. 3 depicts an example system with a machine readable medium that includes instructions to filter out release notes.

FIG. 3 depicts an example system 300 that includes a processing resource 302 coupled to a non-transitory, machine readable medium 304 encoded with example instructions. The processing resource 302 and the machine readable medium 304 may be analogous in many respects to the processing resource 202 and the machine readable medium 204, respectively.

The machine readable medium 304 may be encoded with a set of executable instructions 306, 308, 310, 312, 314. It should be understood that part or all of the executable instructions and/or electronic circuits included within one box may, in alternate implementations, be included in a different box shown in the figures or in a different box not shown. Some implementations of the system 300 may include more or fewer instructions than are shown in FIG. 3. In some implementations, one or more of the instructions 306, 308, 310, 312, 314 may operate in conjunction or in combination with one or more of the instructions 206, 208, 210 described above. In some implementations, one or more of the instructions 306, 308, 310, 312, 314 may be useful for implementing aspects of the upgrade advisor 110, which determines whether a software version is beneficial and recommended for installation on a software-upgradeable device, such as a networking device, based on release notes and a support file.

Instructions 306, when executed, cause the processing resource 302 to analyze a support file to identify a signature of an issue. The signature identified from the support file by execution of instructions 306 may be useful for comparing to one or more signatures included in release notes (e.g., release notes registered by executing instructions 206) relating to issues fixed by the associated software version. Instructions 306 may be utilized to implement functionality 120, for example.

Instructions 308, when executed, cause the processing resource 302 to filter out release notes of the software version that relate to fixes of issues not relevant to the software-upgradeable device based on the support file. In other words, if a release note indicates that the software version fixes a particular issue, but the device does not exhibit that issue in the support file, then the release note is filtered out.

Instructions 310, when executed, cause the processing resource 302 to filter out release notes that relate to enhancements that are not relevant to the software-upgradeable device, and in particular, relevant to the operating state of the software-upgradeable device as described by the support file.

Instructions 312, when executed, cause the processing resource 302 to determine that the software version is not recommended to be installed to the software-upgradeable device in response to release notes having been filtered out after execution instructions 308, 310. In some implementations, instructions 312 may determine the software version is not recommended if at least some associated release notes have been filtered out. In some implementations, instructions 308, 310, 312 may be useful for implementing instructions 210 (e.g., as subroutines within instructions 210) and for implementing functionality 118.

Instructions 314, when executed, cause the processing resource 302 to generate a report indicating that the software version is recommended as an upgrade to be installed to the software-upgradeable device. Instructions 314 may also cause the processing resource 302 to indicate on the report an issue fixed by the software version or an enhancement that the software version provides to the software-upgradeable device. The reported enhancement or issue fixed may be associated with release note(s) that were not filtered out by instructions 308 or 310. Instructions 314 may be utilized to implement functionality 122, for example.

Figure 4:
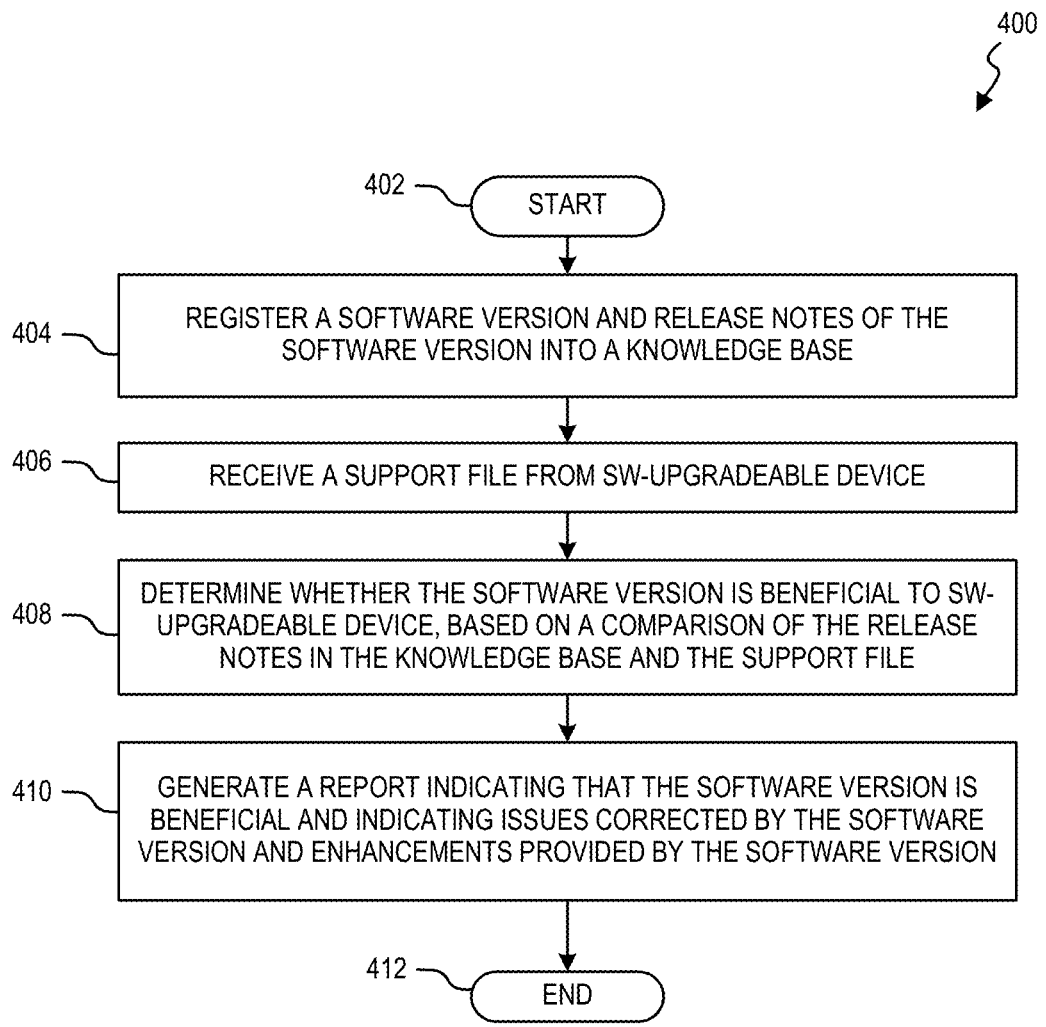
FIG. 4 depicts an example method that includes determining whether a software version would improve operation of a software-upgradeable device.
Figure 5:
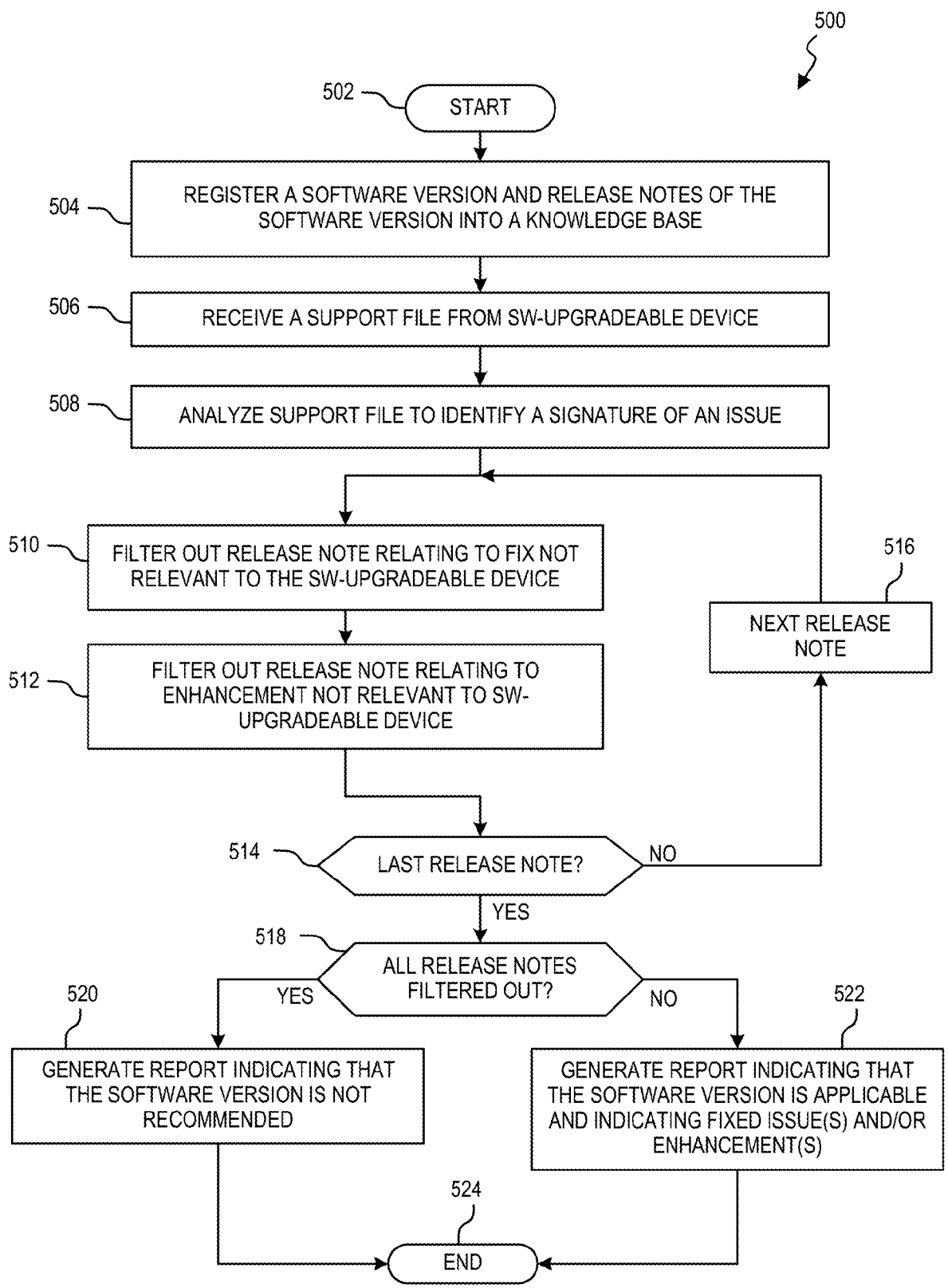
FIG. 5 depicts an example method that includes filtering out release notes.

FIGS. 4 and 5 are flow diagrams depicting various example methods. In some implementations, one or more blocks of the methods may be executed substantially concurrently or in a different order than shown. In some implementations, a method may include more or fewer blocks than are shown. In some implementations, one or more of the blocks of a method may, at certain times, be ongoing and/or may repeat. In some implementations, blocks of the methods may be combined.

The methods shown in FIGS. 4 and 5 may be implemented in the form of executable instructions stored on a machine readable medium (e.g., such as machine readable medium 104, 204, or 304) and executed by a processing resource (e.g., such as processing resource 102, 202, or 302) and/or in the form of electronic circuitry. For example, aspects of the methods may be described below as being performed by an upgrade advisor, which may be similar to upgrade advisor 110.

FIG. 4 is a flow diagram depicting an example method 400. Method 400 starts at block 402 and continues to block 404, where a processor-based upgrade advisor registers a software version and release notes of the software version into a knowledge base. A software version may be accompanied by one or many release notes. Block 404 may be carried out by execution of instructions 206 or functionality 112 of upgrade advisor 110, for example.

At block 406, the upgrade advisor receives a support file from a software-upgradeable device, such as a networking device. In some implementations, the receiving at block 406 may be performed periodically as part of a call home routine of the software-upgradeable device. In some implementations, receiving at block 406 may be performed in connection with a failure of the software-upgradeable device. The support file may include diagnostic statistics and configuration information about the software-upgradeable device. Block 406 may be carried out by execution of instructions 208 or functionality 114 of upgrade advisor 110, for example.

At block 408, the upgrade advisor may determine whether the software version would improve operation of the software-upgradeable device if applied to the software-upgradeable device, based on a comparison of the release notes registered to the knowledge base and the support file. Block 408 may be carried out by execution of instructions 210 or functionality 118 of upgrade advisor 110, for example.

At block 410, the upgrade advisor may generate a report indicating that the software version is determined (by block 408) to improve operation of the software-upgradeable device. The report may also indicate, based on results of the determining at block 408, what issue(s) are corrected by the software version or what enhancement(s) are provided by that the software version to the software-upgradeable device. Block 408 may be carried out by execution of instructions 314 or functionality 122 of upgrade advisor 110, for example. Method 400 may end at block 412.

FIG. 5 is a flow diagram depicting an example method 500. Method 500 starts at block 502 and continues to block 504 (which may be similar to block 404), where a processor-based upgrade advisor registers a software version and release notes of the software version into a knowledge base. As with release notes 142 described above, the release notes may describe changes included in the software version, such as a feature enhancement or a new feature, a security or bug fix, a performance improvement, a scalability improvement. The release notes may also include signatures of issues fixed by the software version. At block 506 (which may be similar to block 406), the upgrade advisor receives a support file from a software-upgradeable device, such as a networking device.

Blocks 510, 512, 514, 516 describe a process of evaluating all release notes related to a given software version. Blocks 510, 512, 514, 516 may be performed for multiple software versions and respective sets of release notes.

At block 508, the upgrade advisor may analyze the support file to identify a signature of an issue. For example, block 508 may include performing analytics, such as machine learning techniques, on the support file. Block 508 may be carried out by execution of instructions 306 or functionality 120 of upgrade advisor 110, for example.

At block 510, the upgrade advisor filters out a release note that relates to a fix of an issue that is not relevant to the software-upgradeable device based on the support file. Specifically, a release note for a fix may include a corresponding signature of the issue addressed by that fix. Block 510 may include determining whether the signature included in the release note matches any signatures identified from the support file in block 508. If the release note signature does not match, then the release note is filtered out. Aspects of block 510 may be carried out by execution of instructions 308 or functionality 118 of upgrade advisor 110, for example.

At block 512, the upgrade advisor filters out a release note relating to an enhancement that is not relevant to the software-upgradeable device. For example, an enhancement is determined to be not relevant if the support file indicates that the feature enhanced by the software version is disabled on the device. As another example, the enhancement is determined to be not relevant if support file does not indicate a type of activity that the enhancement operates on (e.g., network traffic activity should be observed in the support file for a network related feature enhancement). Aspects of block 512 may be carried out by execution of instructions 310 or functionality 118 of upgrade advisor 110, for example.

At block 514, the upgrade advisor determines if the last release note for the software version has been analyzed ("YES" at block 514), in which case method 500 proceeds to block 518. If there are more release notes remaining for the software version ("NO" at block 514), method 500 proceeds to block 516 where the upgrade advisor retrieves the next release note to be evaluated via blocks 510 and 512.

At block 518, the upgrade advisor determines if a threshold level of release notes have been filtered out. For example, the threshold level may be all notes or may be some notes (e.g., 50% or any other percentage). If the threshold level of release notes have been filtered out ("YES" at block 518), the upgrade advisor makes a determination (i.e., a conclusion or resolution) that the software version would not improve operation of the software-upgradeable device. In some implementations, the upgrade advisor may generate a report at block 520 indicating that the software version is not recommended to be installed on the device. If the threshold level of release notes were not filtered out ("NO" at block 518), the upgrade advisor makes a determination that the software version and at least some features thereof are relevant to the device and may generate a report at block 522 similar to the report described above with respect to block 410. Aspects of blocks 518, 520, 522 may be carried out by execution of instructions 312, 314 or functionalities 118, 122 of upgrade advisor 110, for example. Method 500 may end at block 524.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed:

1. A system comprising: a processor; and a memory storing instructions that, when executed, cause the processor to: communicate with a storage device storing a knowledge base to register a software version and release notes of the software version into the knowledge base, communicate with a software-upgradable device to obtain a support file that includes diagnostic statistics and configuration information about the software-upgradable device, apply a machine-learning technique to analyze the support file to identify a signature of an issue, wherein applying the machine-learning technique comprises performing training using support files associated with known issues; generate a metadata tag for the support file corresponding to the identified signature, wherein the metadata tag does not include a human readable description; compare the generated metadata tag for the support file to one or more metadata tags included in the release notes to determine whether the software version is beneficial to the software-upgradable device; in response to determining that the software version is beneficial to the software-upgradable device, generate a report to recommend installation of the software version on the software-upgradable device to facilitate efficient upgrading of the software-upgradable device; and install, via a network, the software version on the software-upgradable device.

2. The system of claim 1, wherein to determine whether the software version is beneficial to the software-upgradable device, the processor executes instructions to:
determine that a fix included in the release notes is relevant to the software-upgradeable device based on the support file, and
determine that an enhancement included in the release notes is relevant to an operational state of the software-upgradable device indicated by the support file.

3. The system of claim 1, wherein the support file is received periodically as part of a call home routine with the software-upgradable device or is received in connection with a failure of the software-upgradable device.

4. The system of claim 1, wherein to determine whether the software version is beneficial to the software-upgradable device, the processor executes instructions to filter out each of the release notes of the software version that is not relevant to the software-upgradable device as described in the support file.

5. The system of claim 4, wherein a given release note of the release notes is not relevant if the support file does not include an issue noted in the given release note as being fixed by the software version, or if the software-upgradeable device as described by the support file cannot make use of any enhancement included in the given release note.

6. The system of claim 1, wherein the software-upgradable device is a networking switch.

7. The system of claim 1, wherein the memory stores instructions that, when executed, cause the processing processor to analyze the release notes to identify signatures of issues fixed by the software version.

8. The system of claim 1, wherein the generated report indicates either an issue corrected by the software version or an enhancement that the software version provides to the software-upgradable device.

9. The system of claim 1, wherein the software version is among a plurality of available software having respective sets of release notes registered in the knowledge base, and the processor is to determine which of the available software is beneficial to the software-upgradable device based on the support file and the respective sets of release notes.

10. The system of claim 1, wherein the release notes indicate that the software version includes a feature enhancement, a security fix, a bug fix, a scalability improvement, or a performance improvement.

11. A method comprising: communicating, by a processor-based upgrade advisor, with a storage device storing a knowledge base to register a software version and release notes of the software version into the knowledge base; communicating, by the processor-based upgrade advisor, with a networking device to obtain a support file that includes diagnostic statistics and configuration information about the networking device; applying a machine-learning technique to analyze the support file to identify a signature of an issue, wherein applying the machine-learning technique comprises performing training using support files associated with known issues; generating a metadata tag for the support file corresponding to the identified signature, wherein the metadata tag does not include a human readable description; comparing the generated metadata tag for the support file to one or more metadata tags included in the release notes to determine, by the processor-based upgrade advisor, whether the software version would improve operation of the networking device if applied to the networking device; generating, by the processor-based upgrade advisor, a report indicating that the software version is determined to improve operation of the networking device and indicating, based on results of the determining, either an issue corrected by the software version or an enhancement that the software version provides to the networking device; and installing, via a network, the software version on the software-upgradable device.

12. The method of claim 11, wherein the determining includes:
filtering out release notes that relate to fixes of issues not relevant to the networking device based on the support file,
filtering out release notes that relate to enhancements that are not relevant to the networking device, and
if at least some release notes have been filtered out, making a determination that the software version would not improve operation of the networking device.

13. The method of claim 11, further comprising analyzing the release notes to identify signatures of issues fixed by the software version.

14. The method of claim 11, wherein the communicating with the networking device is performed periodically as part of a call home routine of the networking device.

15. The method of claim 11, wherein the communicating with the networking device is performed in connection with a failure of the networking device.

16. A non-transitory machine readable medium storing instructions executable by readable medium comprising: a processor, the non-transitory machine instructions to communicate with a storage device storing a knowledge base to register a software version and release notes of the software version into the knowledge base; instructions to communicate with a networking device to obtain a support file that includes diagnostic statistics and configuration information about the networking device; instructions to apply a machine-learning technique to analyze the support file to identify a signature of an issue, wherein applying the machine-learning technique comprises performing training using support files associated with known issues; instructions to generate a metadata tag for the support file corresponding to the identified signature, wherein the metadata tag does not include a human readable description; instructions to compare the generated metadata tag for the support file to one or more metadata tags included in the release notes to determine whether the software version is recommended to be installed to the networking device; instructions to generate a report indicating that the software version is determined to improve operation of the networking device and indicating, based on results of the determining, either an issue corrected by the software version or an enhancement that the software version provides to the networking device; and instructions to install, via a network, the software version on the software-upgradable device.

17. The non-transitory machine readable medium of claim 16 comprising:
   instructions to filter out release notes that relate to fixes of issues not relevant to the networking device based on the support file;
   instructions to filter out release notes that relate to enhancements that are not relevant to an operational state of the networking device indicated by the support file; and
   instructions to determine that the software version is not recommended to be installed to the networking device in response to at least some release notes having been filtered out.

18. The non-transitory machine readable medium of claim 16 comprising instructions to analyze the release notes to identify signatures of issues fixed by the software version.

19. The non-transitory machine readable medium of claim 16, wherein the release notes indicate that the software version includes a feature enhancement, a security fix, a bug fix, a scalability improvement, or a performance improvement.

\* \* \* \* \*